(12) United States Patent
Sawada

(10) Patent No.: US 6,191,699 B1
(45) Date of Patent: Feb. 20, 2001

(54) PORTABLE INFORMATION DEVICE AND DATA TRANSFER DESIGNATION METHOD

(75) Inventor: Fumihiro Sawada, Tokyo (JP)

(73) Assignee: Kabushiki Kaisha Toshiba, Kawasaki (JP)

(*) Notice: Under 35 U.S.C. 154(b), the term of this patent shall be extended for 0 days.

(21) Appl. No.: 09/150,702

(22) Filed: Sep. 10, 1998

(30) Foreign Application Priority Data

Oct. 30, 1997 (JP) .................................................... 9-298769

(51) Int. Cl.[7] ........................................................ G08B 5/22
(52) U.S. Cl. .............................. 340/815.45; 340/825.15; 369/53
(58) Field of Search ...................... 340/815.45, 825.15, 340/10.51; 235/385; 369/53; 370/252

(56) References Cited

U.S. PATENT DOCUMENTS

| | | | |
|---|---|---|---|
| 5,345,495 | * 9/1994 | Black et al. | 379/29 |
| 5,768,495 | * 6/1998 | Campbell et al. | 395/101 |
| 5,876,240 | * 3/1999 | Derstine et al. | 439/490 |

* cited by examiner

Primary Examiner—Donnie L. Crosland
(74) Attorney, Agent, or Firm—Finnegan, Henderson, Farabow, Garrett & Dunner, L.L.P.

(57) ABSTRACT

A portable information device which operates by downloading necessary data from a computer includes an LED, and a system controller for controlling the LED to emit light when data to be transferred to the computer exists in the portable information device.

3 Claims, 3 Drawing Sheets

PORTABLE INFORMATION DEVICE AND DATA TRANSFER DESIGNATION METHOD

BACKGROUND OF THE INVENTION

This application is based on Japanese Patent Application No. 9-298769, filed Oct. 30, 1997, the contents of which are incorporated herein by reference.

The present invention relates to a portable information device such as a mobile NC (Network Computer) and a data transfer designation method.

Recently, personal computers have been used in various forms along with the downsizing of computers and the development of communication techniques. For example, an NC has been developed on the premise that a computer as a client is to be connected to a network.

In this NC, the client computer has a minimum arrangement having a communication function of controlling communication via the network. If necessary, the client computer downloads an operating system, an application program, and various data from a server computer (hereinafter referred to as a server), executes operations, uploads data prepared by the user, and stores it in the server.

When a client NC is a portable information device, it is sometimes disconnected from the server. Before disconnection, the client NC must transfer, to the server, all data to be uploaded thereto.

In the conventional NC, however, the client user can recognize operations only up to preparation of data by an application, and cannot recognize whether the prepared data is uploaded to the server, is still held by the client, or is being uploaded. For this reason, the user may disconnect the terminal from the network before or during upload of the data to the server.

BRIEF SUMMARY OF THE INVENTION

The present invention has been made to solve the conventional drawbacks, and has as its object to provide a portable information device allowing the user to easily recognize the state of data to be transferred to the server, and a data transfer designation method.

To solve the above drawbacks, the present invention causes a light-emitting element to emit light in accordance with the state of data to be transferred to a server computer.

More specifically, according to the present invention, a portable information device which operates by downloading necessary data from a computer while being connected to the computer via a network, comprises a light-emitting element, and control means for controlling the light-emitting element to emit light when data to be transferred to the computer exists in the portable information device. In this case, when the light-emitting element emits light, the user can easily recognize that data to be transferred to the computer still exists.

According to the present invention, a portable information device which operates by downloading necessary data from a computer while being connected to the computer via a network, comprises a light-emitting element, and control means for controlling the light-emitting element to emit light when data to be transferred to the computer is being transferred via the network. In this case, when the light-emitting element emits light, the user can easily recognize that data to be transferred to the computer is being transferred via the network.

According to the present invention, a portable information device which operates by downloading necessary data from a computer while being connected to the computer via a network, comprises a light-emitting element, first control means for controlling the light-emitting element to continuously emit light when data to be transferred to the computer exists in the portable information device, and second control means for controlling the light-emitting element to intermittently emit light when the data to be transferred to the computer is being transferred via the network. In this case, the user can recognize that data to be transferred to the computer still exists when the light-emitting element continuously emits light, and that the data starts to be transferred via the network when the light-emitting element intermittently emits light.

By arranging a plurality of light-emitting elements and sequentially causing them to emit light by the second control means on the basis of the data transfer state, the user can more intuitively recognize the data transfer state.

According to the present invention, a portable information device which downloads, through a network, data held by a computer connected to the network, processes the downloaded data, and transfers the processed data to the computer thereby updating the data held by the computer, comprises: a nonvolatile memory for temporarily storing the processed data when the processed data is to be transferred to the computer; a light-emitting element; and control means for controlling the light-emitting element to emit light when the processed data to be transferred to the computer exists in the nonvolatile memory.

By checking the light emitting state of the light-emitting element, the user can recognize whether data temporarily stored in the nonvolatile memory has actually been transferred to the computer or still remains in the nonvolatile memory without being transferred.

According to the present invention, a portable information device which downloads, through a network, data held by a computer connected to the network, processes the downloaded data, and transfers the processed data to the computer, comprises: a light emitting element; and control means for controlling the light-emitting element to emit light when the data in process and to be transferred to the computer exists in the nonvolatile memory. Also in this case, when the light-emitting element emits light, the user can easily recognize that data in process to be transferred to the computer still exists.

As described above, according to the present invention, when the light emitting device emits light, the user can easily recognize that data to be transferred to the computer still exists. Similarly, the user can recognize that data to be transferred to the computer is being transferred via the network. At this time, even when the data is temporarily stored in the nonvolatile memory, the user can easily recognize by checking the light emitting state of the light-emitting element whether the data has actually been transferred.

Depending on whether the light-emitting element emits light continuously or intermittently, the user can easily recognize whether data to be transferred to the computer exists or is being transferred. In addition, the user can more intuitively recognize the data transfer state by sequentially causing a plurality of light-emitting elements to emit light on the basis of the data transfer state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

A mobile NC according to an embodiment of the present invention will be described with reference to the several views of the accompanying drawing.

Figure 1:
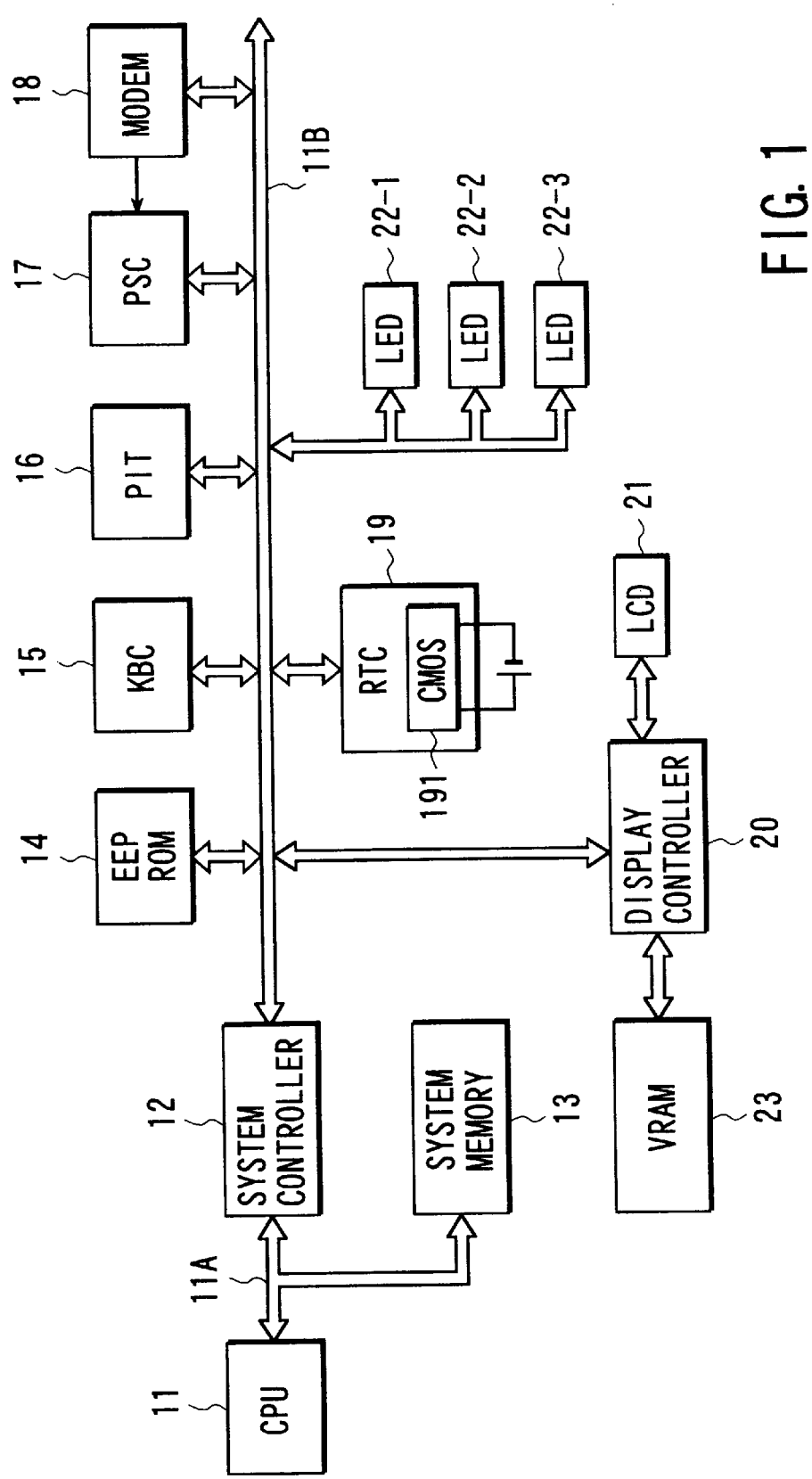
FIG. 1 is a block diagram showing the arrangement of a mobile NC according to an embodiment of the present invention.
Figure 2:
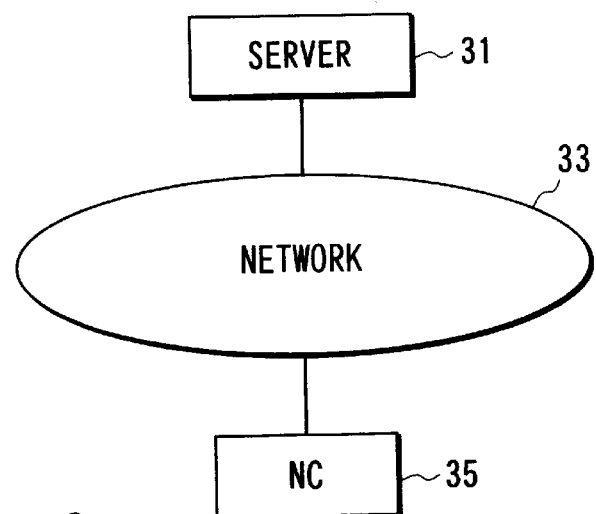
FIG. 2 is a view showing the state wherein the mobile NC shown in FIG. 1 is connected to a server via a network.

FIG. 1 is a block diagram showing the system configuration of the mobile NC. This mobile NC is used while being connected to a server 31 via a network 33, as shown in FIG. 2, and can be carried by disconnecting it from the network. The user downloads and receives data by a mobile NC 35 from the server 31 via the network 33, updates the data, and uploads the updated data to the server 31. Data is updated while the mobile NC 35 is connected to or disconnected from the network 33. When data is updated in a disconnected state from the network, the mobile NC 35 is desirably connected to the server 31 via the network to upload the updated data to the server 31 and to update the data held by the server as soon as possible. Note that the type of network 33 is not specified. That is, any network such as a LAN (Local Area Network), a WAN (Wide Area Network), or a PPP network can be employed.

As shown in FIG. 1, the mobile NC 35 comprises a CPU 11, a system controller 12, a system memory 13, an EEPROM 14, a keyboard controller (KBC) 15, a system timer (PIT) 16, a power supply controller (PSC) 17, a modem 18, a real time clock (RTC) 19, a display controller 20, an LCD 21, LEDs 22-1 to 22-3, and a video memory (VRAM) 23.

The CPU 11 is, e.g., a microprocessor "Pentium" available from Intel Corp., U.S.A. The CPU 11 is connected to the system controller 12 and the system memory 13 via a processor bus 11A having a 64-bit data bus.

The system controller 12 is a gate array for controlling the system memory or an I/O, and functions as a bridge connecting the processor bus 11A and a system bus 11B such as a PCI (Peripheral Component Interconnect) bus.

The system memory 13 is a memory device for storing an operating system, device drivers, application programs to be executed, and processing data which are downloaded from the server 31 via the network 33.

The EEPROM 14 is a nonvolatile memory used as an auxiliary memory device for the mobile NC 35. In this EEPROM 14, minimum software including communication software for downloading data such as an operating system, device drivers, and application programs from the server 31 is stored upon, e.g., connecting the mobile NC 35 to the network 33.

The EEPROM 14 is also used to temporarily store data which is prepared by an application and should be uploaded to the server 31. In the EEPROM 14, authentication user attribute information and the like may be stored.

The modem 18 transmits/receives a line signal in compliance with various standards in order to communicate data with the server 31 on the network 33 via a telephone line. As a method of connecting the mobile NC 35 to the server 31, any method can be selected from a direct connection method using, e.g., an Ethernet cable, a cellular phone, a PHS (Personal Handyphone System) radio communication method, and the like.

The real time clock (RTC) 19 is a timepiece module with its own operating battery, and comprises a CMOS static RAM (to be referred to as a CMOS memory) 191 which always receives power from the battery. The CMOS memory 191 is used to store environment setting information representing the system operating environment.

The display controller 20 controls the LCD 21.

In other words, it controls image display by the LCD 21 on the basis of display data written in the VRAM 23.

Figure 3:
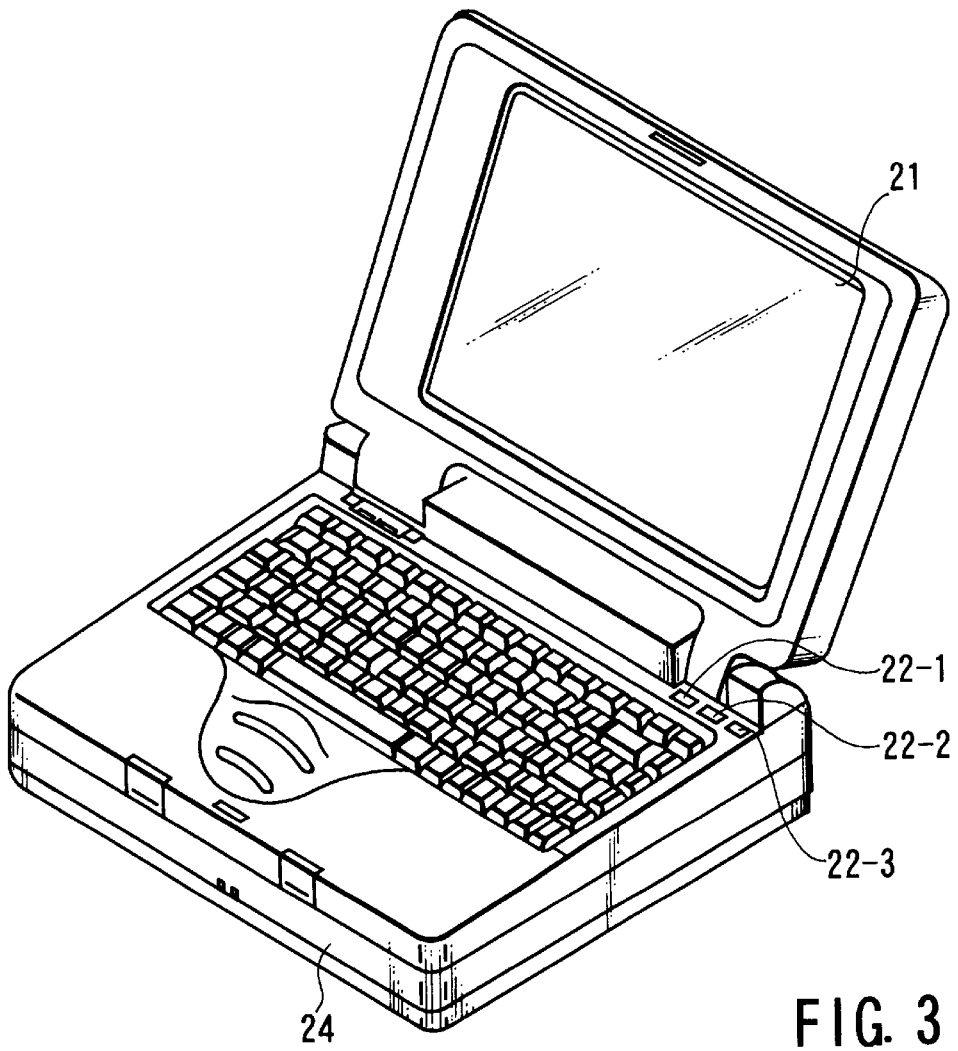
FIG. 3 is a view showing the outer appearance of the mobile NC of the embodiment.

The LEDs 22-1 to 22-3 explicitly inform the user of the presence/absence and transfer state of transfer data by lighting and blinking. They are aligned in a horizontal line at an upper right portion of a mobile NC main body 24 near the panel of the LCD 21, as shown in FIG. 3.

Figure 4:
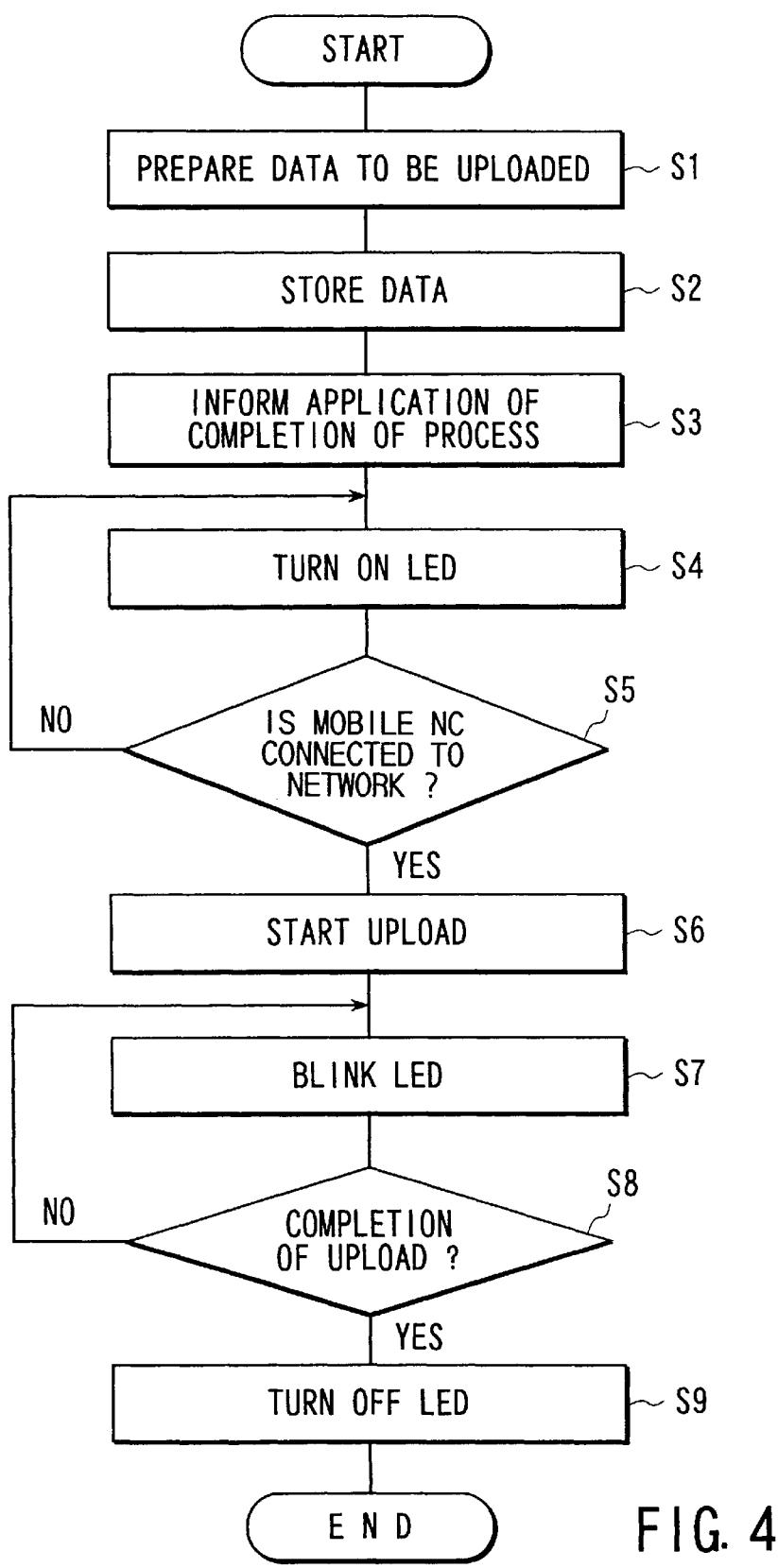
FIG. 4 is a flow chart for explaining upload of data to the server in the mobile NC of the embodiment.

Upload of data by the mobile NC to the server will be explained with reference to FIG. 4.

Assume that the user executes an application on the mobile NC 35 and prepares data (to be referred to as transfer data hereinafter) to be uploaded to the server 31 (step S1).

When the user designates upload of the transfer data and completion of the application program, the transfer data is stored in the EEPROM 14 (step S2).

In this case, the operating system informs the application program of completion of the process, i.e., completion of the upload after the transfer data is stored in the EEPROM 14 (step S3). This process enables the application program to operate regardless of a connection state of the mobile NC 35 to the network 33. Accordingly, the user need not recognize whether the mobile NC is in an environment connected to the network 33. Note that the following process is performed in the background independently of operation of the application program.

When the transfer data is stored in the EEPROM 14, the LEDs 22-1 to 22-3 are turned on in, e.g., orange in order to inform the user of the holding of transfer data to be uploaded to the server 31 (step S4).

The LEDs 22-1 to 22-3 are kept on until the connection state of the mobile NC 35 to the network 33 is checked (step S5), and upload of the transfer data to the server 31 starts (step S6).

When the mobile NC 35 is confirmed to be connected to the network 33 (YES in step S5), upload of the transfer data to the server 31 starts (step S6). Then, the LEDs 22-1 to 22-3 change from the ON state to blinking (step S7) to inform the user that the transfer data is being uploaded.

At this time, the three LEDs 22-1 to 22-3 are sequentially blinked one by one such that the LED 22-1 is first blinked in correspondence with the actual data upload completion amount, then the LED 22-2 is blinked, and the LED 22-3 is finally blinked. In general, the time of data transfer via the network 33 changes under the influence of traffic on the network 33 or the like. With this operation, however, the user can be explicitly informed of the upload state of the transfer data.

When all the transfer data has been uploaded (YES in step S8), the LEDs 22-1 to 22-3 are turned off (step S9) to inform the user of completion of the upload of the transfer data, i.e., the absence of data to be uploaded to the server 31.

In the mobile NC 35 of this embodiment, the LEDs 22-1 to 22-3 are turned on when data to be uploaded to the server 31 exists, blinked while the data is actually uploaded, and turned off when the upload is complete. The user can visually recognize the state of data to be uploaded to the server 31. Unlike a conventional mobile NC 35, the mobile NC 35 of this embodiment is prevented from being erroneously disconnected from the network 33 before or while data is uploaded to the server 31. The data consistency between the server and the client can be reliably maintained.

Since the three LEDs 22-1 to 22-3 are sequentially blinked one by one during upload of data in correspondence with the actual data upload completion amount, the user can more explicitly recognize the progress of upload of the data.

The present invention is not limited to this embodiment and can be variously changed and modified as follows.

The above embodiment has exemplified the mobile NC using the three LEDs 22-1 to 22-3, but the mobile NC may use only one LED. In this case, the LED is desirably turned on when data to be uploaded is held, blinked while the data is actually being uploaded, and turned off when the upload is complete.

The mobile NC may use two LEDs having two different light emitting colors, e.g., orange and green. One orange LED is turned on when data to be uploaded is held, the other green LED is turned on while the data is actually uploaded, and the two LEDs are turned off when the upload is complete.

In the above embodiment, the state of data to be uploaded to the server is indicated by turning on, blinking, and turning off the LEDs 22-1 to 22-3. Instead, the user may be explicitly informed of the state of data by displaying proper images corresponding to the three states on the LCD 21. The LEDs 22-1 to 22-3 and the LCD 21 may simultaneously explicitly indicate the state of data.

In the above embodiment, the state of data to be uploaded to the server is indicated by the LEDs. However, the degree of busyness of the server may be indicated by turning on or blinking the LEDs 22-1 to 22-3.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of transferring data to a computer from a portable information device via a network, comprising:

processing data transferred from the computer via the network to prepare data to be transferred to the computer by using an application program which is installed in the portable information device;

storing the prepared data to be transferred to the computer in a memory of the portable information device in response to an instruction from a user;

informing the application program of completion of the prepared data transfer to the computer after the prepared data is stored in the memory;

turning on one or more light-emitting diodes being provided on the portable information device;

checking whether or not the portable information device is connected to the network;

transferring the stored data from the memory to the computer in a case where a check result represents that the portable information device is connected to the network;

blinking the one or more light-emitting diodes being provided on the portable information device to inform the user of the start of transferring the stored data;

checking whether or not transmission of the stored data is terminated; and turning off the light-emitting diodes in a case where a check result represents that the transmission of the stored data is terminated.

2. The method according to claim 1, wherein the step of blinking the one or more light-emitting diodes controls the light-emitting diodes to sequentially blink the light-emitting diodes based on a transfer state of the stored data to be transferred to the computer.

3. A portable information device which operates by downloading necessary data from a computer, comprising:

means for receiving transfer data from the computer;

a plurality of light-emitting diodes for indicating a transfer state of the transfer data by lighting and blinking; and means for sequentially blinking the plurality of light-emitting diodes one by one during transfer of data in correspondence with actual data transfer completion amount.

* * * * *